United States Patent [15] 3,701,026

Gutleber [45] Oct. 24, 1972

[54] MEDIAN FREQUENCY GENERATOR

[72] Inventor: Frank S. Gutleber, Little Silver, N.J.

[73] Assignee: The United States of America as represented by the Secretary of the Army

[22] Filed: May 13, 1971

[21] Appl. No.: 142,963

[52] U.S. Cl. ....................328/15, 328/133, 328/158
[51] Int. Cl. ....................................H03b 19/00
[58] Field of Search..........328/14, 15, 158, 133, 134

[56] References Cited

UNITED STATES PATENTS

| | | | |
|---|---|---|---|
| 2,992,326 | 7/1961 | Kahn | 328/15 X |
| 3,449,669 | 6/1969 | Granquist | 328/15 |
| 2,866,092 | 12/1958 | Raynsford | 328/133 |
| 2,920,289 | 1/1960 | Meyer | 328/15 |

*Primary Examiner*—James W. Lawrence
*Assistant Examiner*—Harold A. Dixon
*Attorney*—Harry M. Saragovitz, Edward J. Kelly, Herbert Berl and Jeremiah G. Murray

[57] ABSTRACT

The median frequency generator linearly adds two input signals having the same amplitude to obtain a third signal having a frequency equal to the median of the frequencies of the two input signals, an amplitude which varies with time, and a phase which reverses at a frequency equal to the difference in the frequencies of the input signals. Timing pulses are generated by a flip-flop in synchronism with the phase reversals and are used as gating signals to invert the phase reversed portions of the third signal to produce the median frequency output signal.

3 Claims, 10 Drawing Figures

INVENTOR
FRANK S. GUTLEBER
BY Jeremiah G. Murray AGENT
Harry M. Saragovitz,
Edward J. Kelly & Herbert Berl
ATTORNEYS INVENTOR.
FRANK S. GUTLEBER
BY Harry M. Saragovitz, AGENT
Edward J. Kelly & Herbert Berl ATTORNEYS

MEDIAN FREQUENCY GENERATOR

The present invention relates to frequency synthesizers and more particularly to a median frequency generator.

The general purpose of this invention is to provide a median frequency generator which may be used as a basic building block for use in constructing frequency synthesizing systems which have the characteristic of generating a plurality of uniformly spaced frequencies each synchronized to a master clock. Using the median frequency generator of the type contemplated in the present invention, any number of spectral frequencies can be generated with the use of only two oscillators, one a reference oscillator or clock and the other synchronized to it. The only source of drift will be from the reference clock. If it does drift, the entire spectrum of output frequencies will shift with it making the system useful in correlation devices.

Other objects and features of the invention will become apparent to those skilled in the art as the disclosure is made in the following description of a preferred embodiment of the invention as illustrated in the accompanying sheets of drawing in which:

FIG. 3 including

Figure 1:
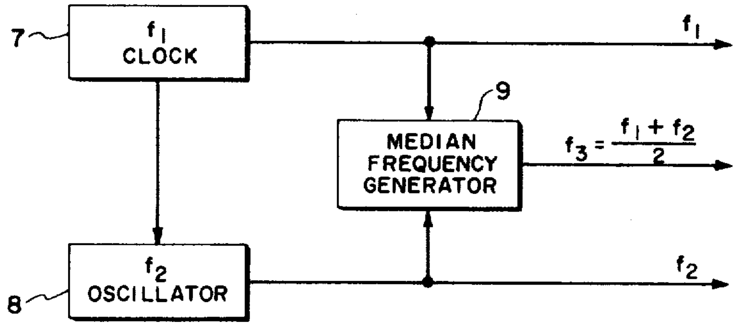
FIG. 1 shows a block diagram of a frequency spectrum synthesizer using the generator of the present invention.

Referring now to the drawing, there is shown in FIG. 1 a frequency spectrum synthesizer having a clock 7 for generating a signal $S_1$ having a frequency $f_1$, and an oscillator 8 synchronized with clock 7 for generating a signal $S_2$ having a frequency $f_2$. Connected to the outputs of clock 7 and oscillator 8 is a median frequency generator 9 which generates a signal $S_3$ having a frequency $f_3$ equal to the median of the frequencies $f_1$ and $f_2$. Additional frequencies may now be synthesized by simply repeating the basic structure shown in FIG. 1. For example, an additional median frequency generator may use the outputs of clock 7 and generator 9 to produce a signal having a frequency which is the median of $f_1$ and $f_3$, or use the outputs of the oscillator 8 and the generator 9 to produce a frequency equal to the median of $f_3$ and $f_2$. A complete frequency synthesizer system having any number of signals of equally spaced frequencies synchronized with the signal $S_1$ generated by clock 7 may therefore be built with the median frequency generator as a building block.

Figure 2:
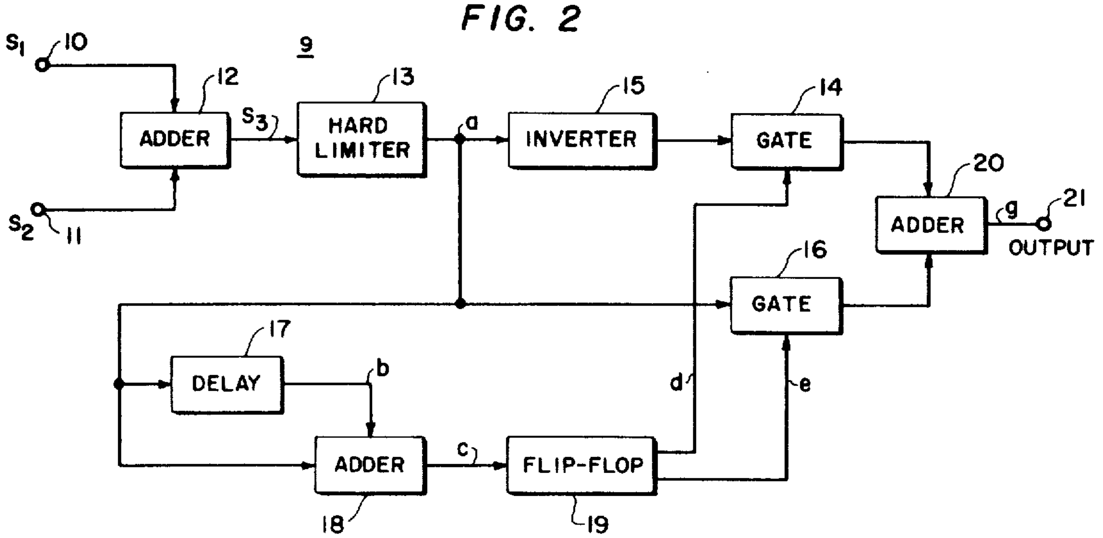
FIG. 2 shows a block diagram of a preferred embodiment of the median frequency generator.
Figures 3A, 3B, 3C, 3D, 3E, 3F, 3G, 3H:
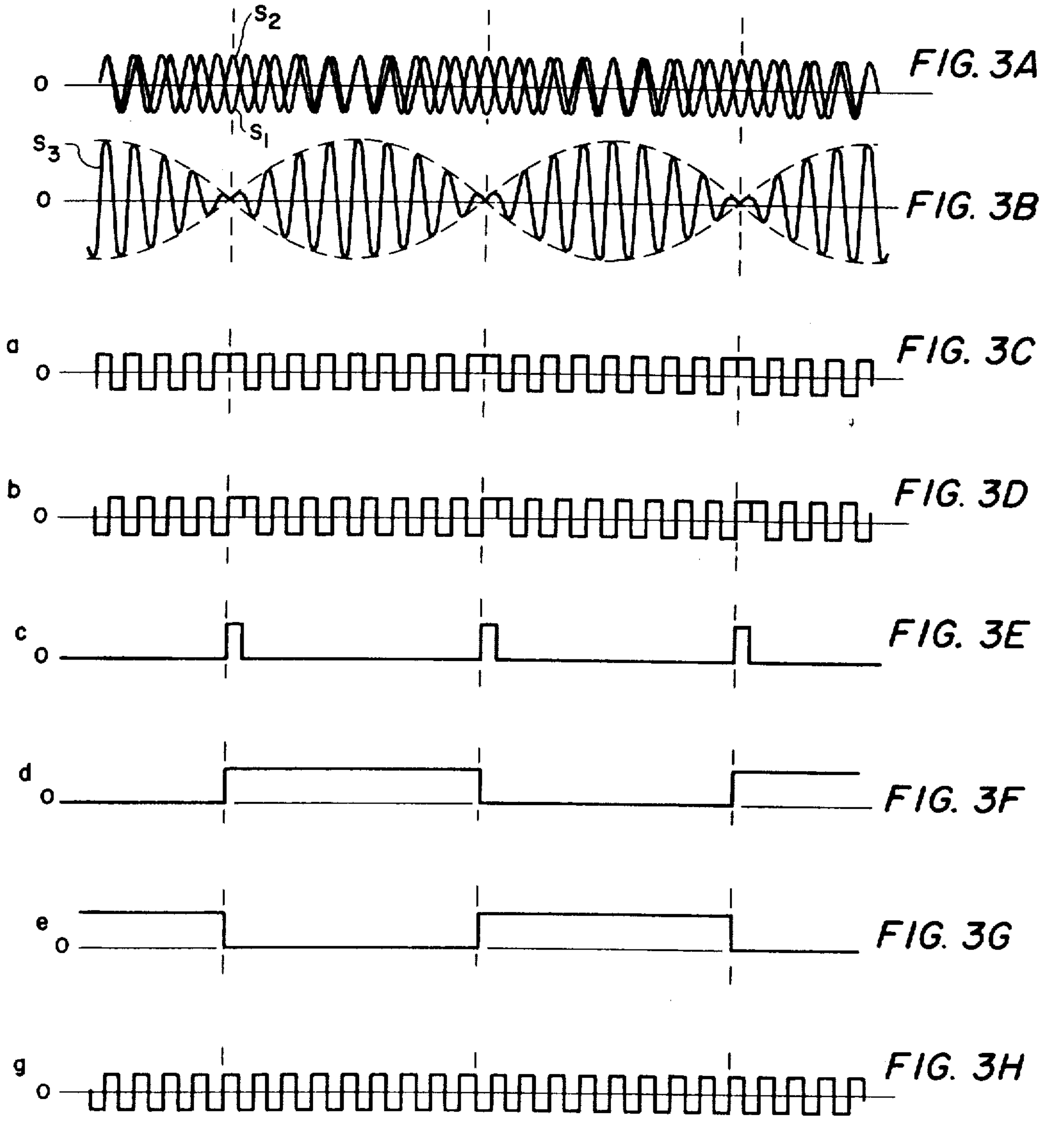
FIGS. 3A–3H is a set of waveforms useful in illustrating the operation of the device shown in FIG. 2.

Referring now to FIGS. 2 and 3, there is shown in greater detail the structure of the median frequency generator 12 and a set of associated waveforms. Input signals $S_1$ and $S_2$ are connected to the input terminals 10 and 11, respectively of linear adder 12. In the example shown in FIG. 3, the signals $S_1$ of FIG. 3A and $S_2$ have frequencies which are related such that nine cycles of signal $S_1$ cover the same time period as eight cycles of signal $S_2$. The linear addition of signals $S_1$ and $S_2$ is shown by waveform $S_3$ of FIG. 3B which represents the output of linear adder 12. The signal $S_3$, as shown in FIG. 2, is applied to the input of a hard limiter 13 which will produce the waveform *a* of FIG. 3C. Signal *a* is delayed by delay 17 for a time period equal to ½ cycle of the median frequency $f_3$ of the signals $f_1$ and $f_2$ to produce the signal *b* as shown in FIG. 3D. Signals *a* and *b* are added in linear adder 18 to produce the signal *c* of FIG. 3E as a trigger input to a flip-flop 19. In the example of FIG. 3, the pulse train *c* is a series of simple positive rectangular pulses because of the relationship between the frequencies $f_1$ and $f_2$. For other frequency relationships the pulses *c* may take other shapes or may be both negative and positive, etc. However, in all cases, the flip-flop 19 may simply be designed to trigger at some predetermined portion of the pulse *c* to produce the complimentary outputs represented by the signals *d* and *e* of FIGS. 3F and 3G respectively. Signal *a* is also applied to one of the inputs of transmission gate 16 via inverter 15 and directly to one of the inputs of transmission gate 14. The other inputs to transmission gates 14 and 16 are connected to the complimentary outputs *d* and *e* respectively of flip-flop 19. The outputs of transmission gates 14 and 16 are combined in the linear adder 20 to produce the signal *g* FIG. 3H at the output terminal 21. As can be seen from the waveforms drawn in FIG. 3, the resulting signal *g* has a frequency which is the median of frequencies $f_1$ and $f_2$, i.e. 8.5 cycles of signal *g* cover the same time period as nine cycles of signal $S_1$ and eight cycles of signal $S_2$.

A more general explanation of the operation of the device shown in FIG. 2 may be made analytically in the following manner. The signals $S_1$ and $S_2$ may be represented by the following expressions.

$$S_1 = S \sin 2\pi f_1 t$$

$$S_2 = S \sin 2\pi f_2 t$$

where $S$ is the peak amplitude of signals $S_1$ and $S_2$. By the superposition principle, the amplitude of the output signal $S_3$ of linear adder 12 may be represented by the following expression:

$$S_3 = S_1 + S_2 = S \sin(2\pi f_1 t) + S \sin(2\pi f_2 t)$$

The above sum may be converted into the following form:

$$S_3 = \left[2S \cos 2\pi \left(\frac{f_1 - f_2}{2}\right) t\right] \sin 2\pi \left(\frac{f_1 + f_2}{2}\right) t$$

The resulting signal $S_3$ may then be considered to have a frequency $$f_3 = (f_1 + f_2)/2$$

which is the median frequency of the signals $S_1$ and $S_2$, and an amplitude given by the expression in brackets. Hence, the amplitude varies with time at a frequency:

$$f_4 = (f_1 - f_2)/2$$

Because of this amplitude modulation, the signal $S_3$ will undergo a phase reversal each time the bracketed portion or $$\cos 2\pi \left(\frac{f_1 - f_2}{2}\right) t$$

equals zero, i.e., each time the envelope passes through zero.

Therefore, in effect the linear addition of signals $S_1$ and $S_2$ results in a signal $S_3$ which basically oscillates at the median frequency $f_3$, but reverses phase at a frequency $$2f_4=f_1-f_2$$

Generation of the median frequency signal with no phase reversals is accomplished by simply inverting the phase reversed portions of signal $S_3$. To accomplish this, the hard limiter 13 shapes the signal $S_3$ by removing the envelope. The delay 17 and adder 18 produce timing signals at the phase reversal periods by cancellation of the signal at the output of limiter 13 everywhere except at the phase reversed points. The pulse train at the output of the adder 18 will have a PRF equal to $f_1-f_2$ and is then used to trigger a flip-flop 19 to obtain synchronous gating pulses for transmitting the in-phase portions of the output of hard limiter 13 through gate 16, and for transmitting an inverted replica of the out-of-phase portions via gate 14. The outputs of gates 14 and 16 are then combined in adder 20 to produce the output signal $S_3$ at terminal 21.

It should be understood, of course, that the foregoing disclosure relates to only a preferred embodiment of the invention and that modifications or alterations may be made therein without departing from the spirit and the scope of the invention as set forth in the appended claims.

What is claimed is:

1. A device for generating an output signal having a frequency which is the median of the frequencies of a pair of original input signals comprising:
   - adder means for receiving said original input signals and for generating a sum signal having a frequency equal to said median frequency and phase reversal points occurring at a frequency equal to one-half the difference between the frequencies of said input signals;
   - timing means connected to the output of said adder means for detecting the locations of said phase reversal points and for generating timing signals in response thereto including
   - limiter means for providing a limited replica of said sum signal,
   - delay means connected to the output of said limiter means for delaying the output signal thereof one-half cycle, and
   - adder means having two inputs, one connected to the output of said delay means and the other connected to the output of said limiter means, for producing a series of spaced pulses at said phase reversal points; and
   - transmitting means including phase reversal means responsive to said timing signal for selectively inverting the phase of said sum signal to remove said phase reversal points and for transmitting said sum signal at said median frequency.

2. The device according to claim 1 and wherein said transmission means includes:
   - an inverter means connected to the output of said limiter means for reversing the phase of said limited sum signal to provide an inverted limited sum signal;
   - first and second transmission gate means each having a transmission input and a gating input and having the transmission inputs thereof connected to the outputs of said inverter means and said limiter means respectively for transmitting said sum signal and said inverted sum signal upon receiving a gating pulse at said gating inputs; and
   - gating pulse means responsive to said timing means and connected to said gating inputs for generating said gating pulses whereby said transmission gates alternately transmit said limited sum signal and said inverted limited sum signal.

3. A device for generating an output signal having a frequency which is the median of the frequencies of a pair of original input signals comprising:
   - first adder means for linearly adding said original input signals;
   - limiter means connected to the output of said first adder means for removing variations in the absolute value of the amplitude of the output signal of said adder means;
   - delay means connected to the output of said limiter means for delaying one-half cycle the output signal thereof;
   - second adder means for linearly adding the outputs of said limiter and said delay means for producing a series of spaced trigger pulses;
   - bistable multivibrator mans having the input thereof connected to the output of said second adder means and responsive to said trigger pulses for providing complimentary gating pulses at the outputs thereof;
   - inverter means connected to the output of said limiter means for inverting the output signal of said limiter means;
   - first transmission gate means connected to one of said multivibrator outputs and the output signal of said inverter means for transmitting the output of said inverter means in response to one of said complimentary gating pulses;
   - second transmission gate means connected to the other of said multivibrator outputs and the output of said hard limiter means for transmitting the output signal of said hard limiter means in response to the other of said complimentary gating pulses; and
   - third adder means for linearly adding the outputs of said first and second transmission gate means for producing a signal having a frequency which is the median of the frequencies of said pair of original input signals.

* * * * *